United States Patent
Harada et al.

(10) Patent No.: US 10,106,628 B2
(45) Date of Patent: Oct. 23, 2018

(54) GEL WITH SELF-RESTORABILITY AND SHAPE-MEMORY PROPERTY AND PROCESS FOR PRODUCING SAME

(71) Applicant: Osaka University, Suita-shi (JP)

(72) Inventors: Akira Harada, Suita (JP); Yoshinori Takashima, Suita (JP); Takahiro Kakuta, Suita (JP)

(73) Assignee: Osaka University, Suita-shi (JP)

( * ) Notice: Subject to any disclaimer, the term of this patent is extended or adjusted under 35 U.S.C. 154(b) by 0 days.

(21) Appl. No.: 14/395,638

(22) PCT Filed: Apr. 26, 2013

(86) PCT No.: PCT/JP2013/062461
§ 371 (c)(1),
(2) Date: Oct. 20, 2014

(87) PCT Pub. No.: WO2013/162019
PCT Pub. Date: Oct. 31, 2013

(65) Prior Publication Data
US 2015/0073091 A1 Mar. 12, 2015

(30) Foreign Application Priority Data

Apr. 27, 2012 (JP) ................................ 2012-103460

(51) Int. Cl.
*C08F 2/10* (2006.01)
*C08F 220/18* (2006.01)
(Continued)

(52) U.S. Cl.
CPC .............. *C08F 2/10* (2013.01); *C08F 220/06* (2013.01); *C08F 220/18* (2013.01); *C08F 220/20* (2013.01); *C08F 220/56* (2013.01)

(58) Field of Classification Search
CPC .................................... C08L 5/16; C08F 2/10
See application file for complete search history.

(56) References Cited

U.S. PATENT DOCUMENTS 4,708,981 A * 11/1987 Zupancic ............. B01D 69/141
524/417
5,357,012 A * 10/1994 Nussstein ................ B01J 20/26
526/207
(Continued)

FOREIGN PATENT DOCUMENTS

EP 2154166 A1 2/2010
JP 2001-505236 A 4/2001
(Continued)

OTHER PUBLICATIONS

Huang et al. Journal of Applied Polymer Science, vol. 113, pp. 3068-3077 (2009).*
(Continued)

*Primary Examiner* — Michael A Salvitti
(74) *Attorney, Agent, or Firm* — Locke Lord LLP

(57) ABSTRACT

The present invention provides a gel formed by a host-guest interaction and having self-healing and shape-memory properties, and a process for producing the gel. A monomer containing a host group, a monomer containing a guest group, and an acrylic type monomer were dissolved in an aqueous solvent, and these monomers were subsequently copolymerized to produce a gel obtained from these monomers.

17 Claims, 8 Drawing Sheets

Host-guest gel  $(m, n)$

(51) Int. Cl.
*C08F 220/56* (2006.01)
*C08F 220/06* (2006.01)
*C08F 220/20* (2006.01)

(56) References Cited

U.S. PATENT DOCUMENTS

| | | | | |
|---|---|---|---|---|
| 5,898,004 | A * | 4/1999 | Asher et al. | 436/518 |
| 7,893,125 | B2 * | 2/2011 | Nelles et al. | 522/16 |
| 2005/0032995 | A1 * | 2/2005 | Kulkarni et al. | 526/219.6 |
| 2005/0096443 | A1 * | 5/2005 | Kulkarni | C08F 2/10 526/303.1 |
| 2006/0094844 | A1 * | 5/2006 | Patil et al. | 526/225 |
| 2007/0149701 | A1 * | 6/2007 | Dairoku et al. | 524/556 |
| 2007/0213489 | A1 * | 9/2007 | Patil et al. | 526/303.1 |
| 2007/0265365 | A1 * | 11/2007 | Patil et al. | 522/33 |
| 2009/0221729 | A1 * | 9/2009 | Kulkarni et al. | 522/62 |
| 2011/0200661 | A1 * | 8/2011 | Alvarez Lorenzo et al. | 424/429 |
| 2012/0095165 | A1 * | 4/2012 | Rees et al. | 525/54.1 |
| 2013/0172479 | A1 * | 7/2013 | Harada et al. | 524/555 |
| 2015/0073091 | A1 * | 3/2015 | Harada et al. | 524/811 |
| 2015/0337121 | A1 * | 11/2015 | Singh et al. | 524/458 |
| 2016/0237225 | A1 * | 8/2016 | Bian | A61L 27/54 |

FOREIGN PATENT DOCUMENTS

| | | |
|---|---|---|
| JP | 2002-239358 A | 8/2002 |
| JP | 2005-289882 A | 10/2005 |
| JP | 2006-299170 A | 11/2006 |
| JP | 2008-239722 A | 10/2008 |
| JP | 2010-159345 A | 7/2010 |
| JP | 2012-224559 A | 11/2012 |
| WO | WO-1998/019787 A1 | 5/1998 |
| WO | WO-2012/036069 A1 | 3/2012 |

OTHER PUBLICATIONS

Markus J. Kettel et al., "Aqueous nanogels modified with cyclodextrin," Polymer, vol. 52, No. 9, Apr. 1, 2011, pp. 1917-1924.
Supplementary Partial European Search Report dated Nov. 12, 2015 for EP Patent Application No. 13781751.6.
International Search Report dated Jul. 9, 2013, issued for PCT/JP2013/062461.
Office Action dated Jul. 4, 2017, issued for the corresponding JP patent application No. 2016-114770 and English translation thereof.

* cited by examiner

Intact state | Rupture | 24 hours of standing after adhesion | Re-adhesion

Intact state | Rupture | 24 hours of standing after adhesion | Re-adhesion

GEL WITH SELF-RESTORABILITY AND SHAPE-MEMORY PROPERTY AND PROCESS FOR PRODUCING SAME

TECHNICAL FIELD

The present invention relates to a gel having self-healing (self-restorability) and shape-memory properties, and a process for producing the gel.

BACKGROUND ART

Polymer materials having self-healing properties have been actively investigated in recent years. In a hydrogel formed by crosslinking via an ordinary covalent bond, once the bond is cut, binding back is impossible. Therefore, self-healing has been difficult.

As self-healing materials that restore themselves via a non-covalent bond whose binding reversible, materials having hydrogen bonds, bonds utilizing ionic interaction, aromatic π-π interaction, metal complex formation, and coordination bonding, and dynamic covalent bonds utilizing formation of radicals that easily bind and dissociate are known (Patent Literature (PTL) 1). However, none of the bonds are sufficient in terms of bonding strength. Further, self-healing materials formed via the above bonds rebind at a site different from the cleavage site, and also have problems in terms of shape-memory properties.

CITATION LIST

PTL

PTL 1: JP2008-239722A

SUMMARY OF INVENTION

Technical Problem

An object of the present invention is to provide a gel formed by a host-guest interaction and having self-healing and shape-memory properties, and a process for producing the gel.

Solution to Problem

The present inventors conducted intensive studies in view of the above problem, and found that when a monomer containing a host group, a monomer containing a guest group, and an acrylic type monomer are dissolved in an aqueous solvent, and these monomers are subsequently copolymerized, a gel obtained from these monomers can be produced. The present invention was completed after further studies based on this finding.

Specifically, the present invention provides a gel having non-covalent crosslinking formed by a host-guest interaction, and having self-healing and shape-memory properties; and a process for producing the gel.

Item 1. A process for producing an aqueous solvent solution containing a host group-containing monomer, a guest group-containing monomer, and an acrylic type monomer, the process comprising the steps of mixing the host group-containing monomer, the guest group-containing monomer, and the acrylic type monomer in an aqueous solvent, and heating the mixture obtained in the above step at 40 to 80° C. to obtain an aqueous solvent solution of the monomers.

Item 2. The process according to Item 1, wherein the host group-containing monomer is a monomer represented by formula (1)

[Chem. 1]

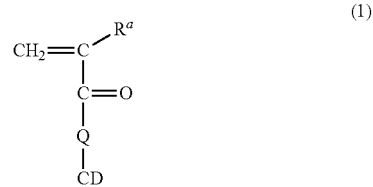

(wherein Q is O or NH, CD is α-cyclodextrin, β-cyclodextrin, or γ-cyclodextrin, and $R^a$ is a hydrogen atom or a methyl group).

Item 3. The process according to Item 1 or 2, wherein the guest group-containing monomer is a monomer represented by formula (2)

[Chem. 2]

(wherein A is an optionally substituted aryl group, $C(O)OR^1$, or $C(O)NHR^1$, $R^1$ is an optionally substituted alkyl group, an optionally substituted aryl group, or an optionally substituted arylalkyl group, and $R^b$ is a hydrogen atom or a methyl group).

Item 4. The process according to any one of Items 1 to 3, wherein the acrylic type monomer is a monomer represented by formula (3)

[Chem. 3]

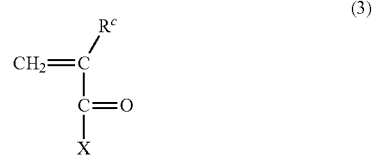

(wherein X is $OR^2$ or $NH_2$, $R^2$ is a hydrogen atom, an optionally substituted alkyl group, or an optionally substituted aryl group, and $R^c$ is a hydrogen atom or a methyl group).

Item 5. The process according to any one of Items 1 to 4, wherein the host group-containing monomer is used in an amount of 30 to 0.5 mol %, the guest group-containing monomer is used in an amount of 30 to 0.5 mol %, and the acrylic type monomer is used in an amount of 40 to 99 mol %.

Item 6. The process according to any one of Items 1 to 5, wherein the aqueous solvent is water or a mixed solvent of water and an organic solvent compatible with water.

Item 7. A process for producing a gel, comprising copolymerizing the monomers in the aqueous solvent solution obtained in Item 1 to produce a gel obtained from the host group-containing monomer, the guest group-containing monomer, and the acrylic type monomer.

Item 8. The process according to Item 7, wherein the copolymerization is conducted at 0 to 100° C.

Item 9. A gel obtained by the process according to Item 7 or 8.

Item 10. The gel according to Item 9, comprising 20 to 0.1 mol % of units derived from the host group-containing monomer, 20 to 0.1 mol % of units derived from the guest group-containing monomer, and 60 to 99.8 mol % of units derived from the acrylic type monomer.

Advantageous Effects of Invention

According to the process for producing an aqueous solvent solution of the present invention, host and guest groups in monomers can form an inclusion complex in an aqueous solvent.

According to the production process of the present invention, a gel having self-healing and shape-memory properties formed by a host-guest interaction can be obtained.

The production process of the present invention is simple, is highly safe, and uses inexpensive renewable resources. Therefore, this production process is useful and suitable for a recycling-oriented society.

According to the gel of the present invention, when the gel is ruptured, the portion crosslinked by a host-guest interaction is dissociated and cut. Self-healing occurs by rebinding through the host-guest interaction; therefore, the gel of the present invention can recover to the original material strength after healing.

The gel of the present invention selectively heals itself on the rupture surfaces through a host-guest interaction.

The gel of the present invention is highly self-supporting and highly tensile because the gel is formed through non-covalent bonding between a host group and a guest group. Furthermore, the gel of the present invention has shape-memory properties such that the gel quickly returns to its original shape after stretching.

α-cyclodextrin, guest group: n-butyl, and host group: β-cyclodextrin, guest group: adamantane) with lapse of adhesion time.

Figure 9:
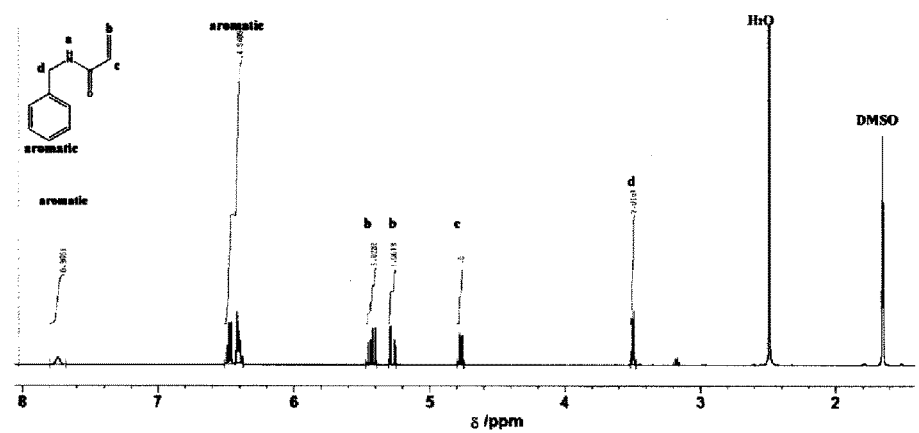

FIG. 9 is a $^1$H NMR chart of N-benzylacrylamide obtained in Example 5.

Figure 10:
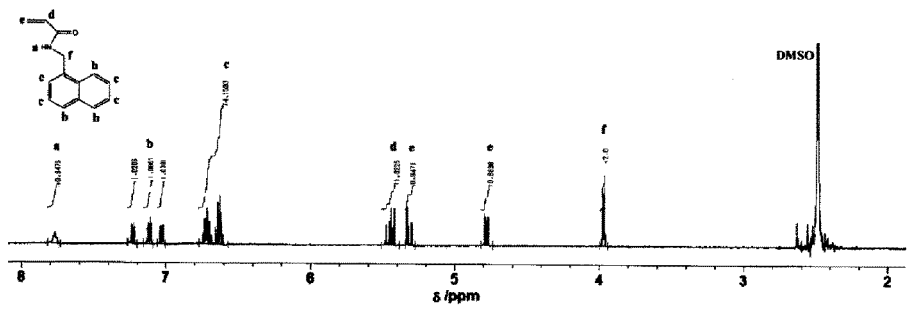

FIG. 10 is a $^1$H NMR chart of N-(1-naphthylmethyl) acrylamide obtained in Example 7.

Figure 11:
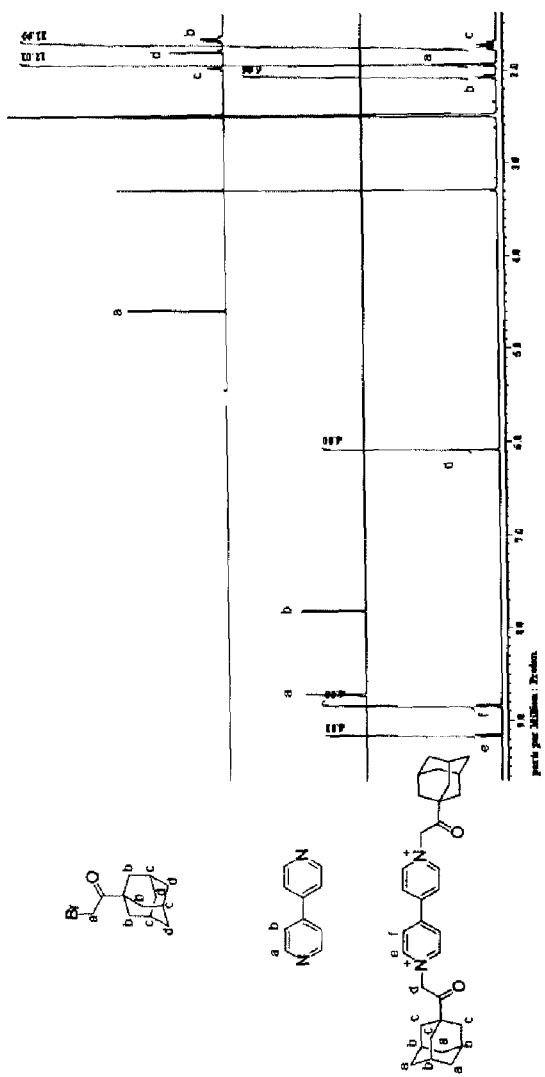

FIG. 11 is a $^1$H NMR chart of the compound having two guest groups (adamanthyl groups), which was obtained in Example 13.

Figure 12:
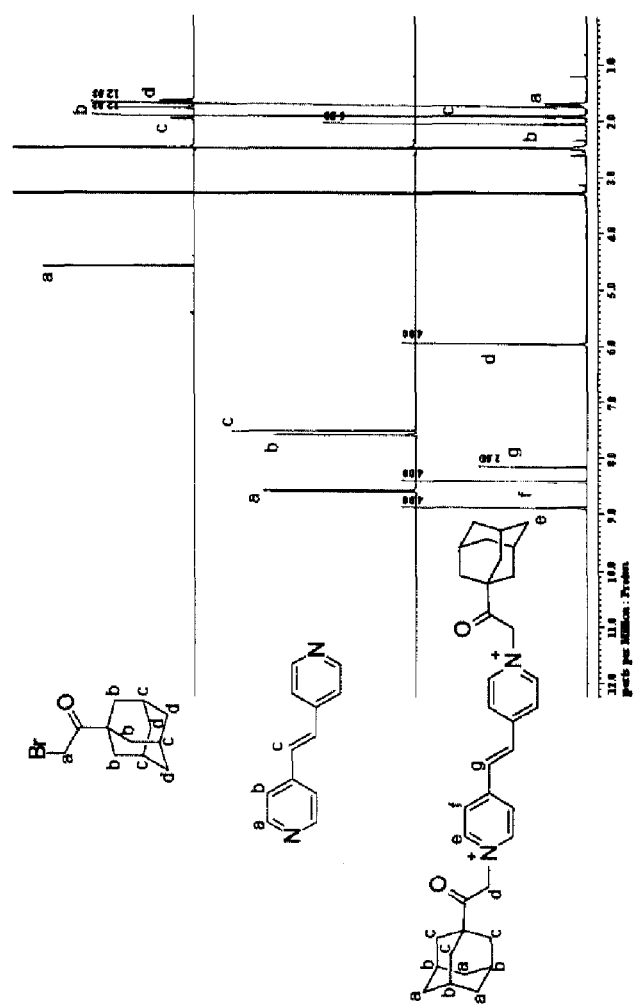

FIG. 12 is a $^1$H NMR chart of the compound having two guest groups (adamanthyl groups), which was obtained in Example 14.

Figure 13:
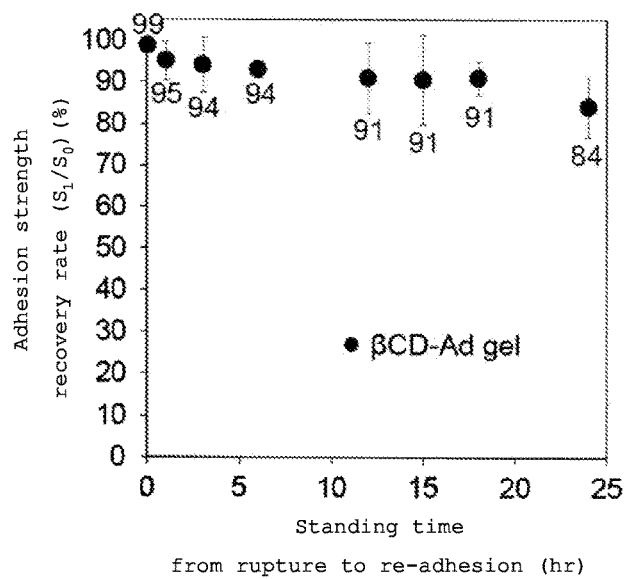

FIG. 13 is a diagram showing the recovery rate of adhesion strength of a gel (host group: β-cyclodextrin, guest group: adamantane) with lapse of time after rupture.

Figure 14:
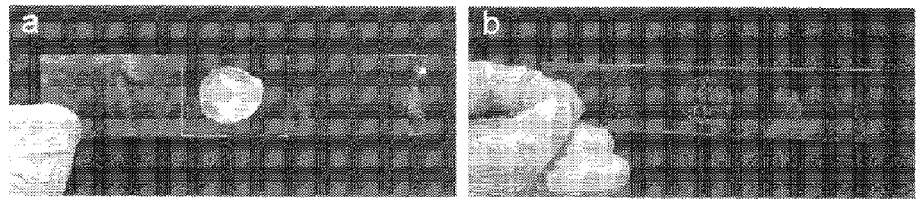

FIG. 14 is photographs showing the state of adhesion of a gel of the present invention (host group: β-cyclodextrin, guest group: adamantane), the gel being sandwiched between glass plates, compressed in water, and dried, with photograph (a) being taken after the compression in water, and photograph (b) being taken after the drying.

DESCRIPTION OF EMBODIMENTS

The present invention is described in detail below.

The process of the present invention comprises a method of obtaining an aqueous solvent solution by dissolving a host group-containing monomer, a guest group-containing monomer, and an acrylic type monomer in an aqueous solvent; and a method of producing a gel obtained from the host group-containing monomer, the guest group-containing monomer, and the acrylic type monomer by copolymerizing the dissolved monomers.

1. Monomer a. Host Group-Containing Monomer

The host group-containing monomer of the present invention is a vinyl monomer containing at least one host group (preferably one host group).

Examples of the host group include artificial host molecules, such as derivatives of cyclodextrin (CD), calixarene, crown ether, cyclophane, and cucurbituril. Specific examples include α-cyclodextrin, β-cyclodextrin, γ-cyclodextrin, calix[6]arene sulfonate, calix[8]arene sulfonate, 12-crown-4,18-crown-6,[6]paracyclophane, [2,2]paracyclophane, cucurbit[6]uril, and cucurbit[8]uril. Of these, α-cyclodextrin, β-cyclodextrin, and γ-cyclodextrin are preferred.

Examples of the host group-containing monomer include a monomer represented by the following formula (1):

[Chem. 4]

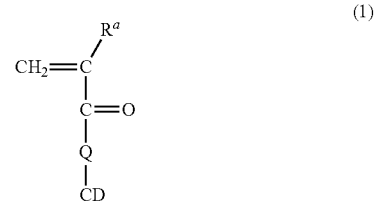

(1)

(wherein Q is O or NH, CD is α-cyclodextrin, β-cyclodextrin, or γ-cyclodextrin, and $R^a$ is a hydrogen atom or a methyl group).

Q is preferably NH. Examples of the monomers represented by formula (1) include 6-acrylamide-α-cyclodextrin and 6-acrylamide-β-cyclodextrin.

The monomer represented by formula (1) can be produced by reacting acryloyl chloride with 6-aminocyclodextrin or cyclodextrin. Typically, acryloyl chloride is mixed with 6-aminocyclodextrin or cyclodextrin and stirred in a solvent.

The reaction may be performed either solvent-free, or with a solvent (an organic solvent or an aqueous solvent) commonly used in organic synthesis reactions. Examples of the organic solvent include dimethylsulfoxide (DMSO) and dimethylformamide (DMF). Examples of the aqueous solvent include water, and buffers that contain salts such as sodium phosphate and sodium carbonate as required. When a solvent is used, the amount of the solvent may be appropriately adjusted.

Alternatively, the monomer represented by formula (1) wherein Q is NH can be produced by using a method in which 1,1'-carbonyldiimidazole (CDI) or 1-ethyl-3-(3-dimethylaminopropyl)carbodiimide hydrochloride (EDC) is added to acrylic acid under ice-cooled conditions, and aminocyclodextrin is added to the mixture and stirred overnight to form an amide bond. The monomer of formula (1) can also be produced by obtaining an amide compound from acrylic acid via an active ester, using dicyclohexylcarbodiimide (DCC) and 1-hydroxybenzotriazole (HOBt) or N-hydroxysuccinimide (HOSu) as condensing agents.

The monomer represented by formula (1) wherein Q is O can be produced by using a method in which N,N-dimethyl-4-aminopyridine is added to acrylic acid under ice-cooled conditions, and cyclodextrin is then added to the mixture and stirred overnight to form an ester bond. Alternatively, the monomer of formula (1) can also be produced by obtaining an ester compound from acrylic acid via an active ester using dicyclohexylcarbodiimide (DCC) and either 1-hydroxybenzotriazole (HOBt) or N-hydroxysuccinimide (HOSu) as condensing agents.

In place of the host group-containing monomer, a compound containing two or more host groups may be used. Examples of the host groups may be the same as those mentioned above as examples of the host group of the host group-containing monomer mentioned above.

Examples of the compound containing two or more host groups include dicyclodextrinpoly(allylamine)dendrimer (generation 0) monoacrylamide, dicyclodextrinpoly(allylamine)dendrimer (generation 0) diacrylamide, dicyclodextrinpoly(allylamine)dendrimer (generation 0) monoacrylate, dicyclodextrinpoly(allylamine)dendrimer (generation 0) diacrylate, tricyclodextrinpoly(allylamine)dendrimer (generation 0) monoacrylamide, and tricyclodextrinpoly(allylamine)dendrimer (generation 0) monoacrylamide.

b. Guest Group-Containing Monomer

The guest group-containing monomer of the present invention is a vinyl monomer having at least one guest group (preferably one guest group).

The guest group may be any group that can be a guest group for a corresponding host group. Examples of the guest group include alkyl groups that may have a substituent or substituents, cycloalkyl groups, and aryl groups that may have a substituent or substituents.

Examples of the guest group-containing monomer include a monomer represented by the following formula (2):

[Chem. 5]

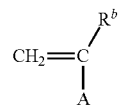

(wherein A is an optionally substituted aryl group, $C(O)OR^1$, or $C(O)NHR^1$, $R^1$ is an optionally substituted alkyl group, an optionally substituted aryl group, or an optionally substituted arylalkyl group, and $R^b$ is a hydrogen atom or a methyl group).

Examples of the alkyl group of the optionally substituted alkyl group represented by $R^1$ in formula (2) include linear, branched, or cyclic alkyl groups of $C_1$ to $C_{18}$. Specific examples include alkyl groups such as methyl, ethyl, n-propyl, isopropyl, n-butyl, isobutyl, sec-butyl, tert-butyl, pentyl, cyclopentyl, hexyl, cyclohexyl, isohexyl, dodecyl, octadecyl, and adamantyl. Of these, adamantyl and butyl are preferred, and adamantyl is particularly preferred. The alkyl group may have 1 to 3 substituents, for example, such as halogen atoms (for example, such as fluorine, chlorine, and bromine), carboxyl groups, ester groups, amide groups, and hydroxyl groups that may be protected. Further, the alkyl group may be one in which the organometallic complex ferrocene is attached as a substituent.

Examples of the aryl group of the optionally substituted aryl group represented by A and $R^1$ in formula (2) include monocyclic aryl groups, and aryl groups with two or more rings. Specific examples include phenyl, toluoyl, xylyl, naphthyl, anthryl, and phenanthryl. Of these, phenyl is preferred. The aryl group may have 1 to 3 substituents, for example, such as alkyl groups (for example, such as $C_1$ to $C_{18}$ alkyl groups), halogen atoms (for example, such as fluorine, chlorine, and bromine), carboxyl groups, ester groups, amide groups, azo groups having aryl groups, and hydroxyl groups that may be protected.

Examples of the arylalkyl group of the optionally substituted arylalkyl group represented by $R^1$ in formula (2) include branched or linear $C_1$ to $C_3$ lower alkyl groups substituted with monocyclic aryl groups or aryl groups with two or more rings. Specific examples include benzyl, naphthylmethyl, anthracenemethyl, and pyrenemethyl. Benzyl and naphthylmethyl are preferred. The aryl group may have 1 to 3 substituents, for example, such as alkyl groups (for example, such as $C_1$ to $C_{18}$ alkyl groups), halogen atoms (for example, such as fluorine, chlorine, and bromine), carboxyl groups, ester groups, amide groups, azo groups having aryl groups, and hydroxyl groups that may be protected. Examples of the aryl group include hydroxyphenylmethyl, methylphenylmethyl, dimethylphenylmethyl, trimethylphenylmethyl, carboxyphenylmethyl, hydroxymethylphenylmethyl, and triphenylmethyl.

Examples of preferable monomers represented by formula (2) include n-butyl acrylate, t-butyl acrylate, N-(1-adamantyl)acrylamide, N-benzylacrylamide, N-1-naphthylmethylacrylamide, and styrene.

As the monomer represented by formula (2) wherein A is an optionally substituted aryl group, a commercially available monomer (such as styrene) can be used unmodified.

The monomer represented by formula (2) wherein A is $C(O)OR^1$ or $C(O)NHR^1$ is produced by reacting acryloyl chloride with an alkyl amine or an aryl amine that provides an alkyl or an aryl for the substituent $R^1$. Typically, acryloyl chloride is mixed and stirred in a solvent with an alkyl amine or an aryl amine that provides an alkyl or an aryl for the substituent $R^1$.

The same solvent as used for the production of the monomer represented by formula (1) can be used in the reaction. When a solvent is used, the amount of the solvent may be appropriately adjusted.

Alternatively, the monomer represented by formula (2) wherein A is $C(O)NHR^1$ can be produced by using a method in which 1,1'-carbonyldiimidazole (CDT) or 1-ethyl-3-(3-dimethylaminopropyl)carbodiimide hydrochloride (EDC) is added to acrylic acid under ice-cooled conditions, and aminocyclodextrin is added to the mixture and stirred overnight to form an amide bond. The monomer of formula (2) can also be produced by obtaining an amide compound from acrylic acid via an active ester using dicyclohexylcarbodiimide (DCC) and 1-hydroxybenzotriazole (HOBt) or N-hydroxysuccinimide (HOSu) as condensing agents.

The monomer represented by formula (2) wherein A is $C(O)OR^1$ can be produced by using a method in which N,N-dimethyl-4-aminopyridine is added to acrylic acid under ice-cooled conditions, and cyclodextrin is added to the mixture and stirred overnight to form an ester bond. Alternatively, the monomer of formula (2) can also be produced by obtaining an ester compound from acrylic acid via an active ester using dicyclohexylcarbodiimide (DCC) and 1-hydroxybenzotriazole (HOBt) or N-hydroxysuccinimide (HOSu) as condensing agents.

In place of the guest group-containing monomer, a compound containing two or more guest groups may be used. Examples of the guest groups may be the same as those mentioned above as examples of the guest group of the guest-containing monomer.

Examples of the compound containing two or more guest groups include di(1-adamanthylmethylketone)-4,4-dipyridine, di(1-butylmethylketone)-4,4-dipyridine, di(1-azobenzenemethylketone)-4,4-dipyridine, di(1-ferrocenemethylketone)-4,4-dipyridine, di(1-adamanthylmethylketone)-1,2-bis (4-pyridyl)ethylene, di(1-butylmethylketone)-1,2-bis(4-pyridyl)ethylene, di(1-azobenzenemethylketone)-1,2-bis(4-pyridyl)ethylene, di(1-ferrocenemethylketone)-1,2-bis(4-pyridyl)ethylene, diadamanthyl-polyethylene glycol, diadamanthyl-polypropylene glycol, tetraadamanthyl-polyethylene glycol, tetraadamanthyl-polypropylene glycol, octaadamanthyl-polyethylene glycol, and octaadamanthyl-polypropylene glycol.

c. Acrylic Type Monomer

The acrylic type monomer of the present invention refers to acrylic acid or methacrylic acid, and derivatives (e.g., esters and amides) thereof.

Examples of the acrylic type monomer of the present invention include monomers represented by the following formula (3):

[Chem. 6]

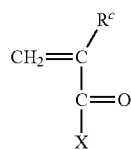

(3)

(wherein X is $OR^2$ or $NH_2$, $R^2$ is a hydrogen atom, an optionally substituted alkyl group, or an optionally substituted aryl group, and $R^c$ is a hydrogen atom or a methyl group).

Examples of the alkyl group of the optionally substituted alkyl group represented by $R^2$ in formula (3) may be the same as those mentioned above as examples of the alkyl group of the optionally substituted alkyl group represented by $R^1$ in formula (2).

Examples of the aryl group of the optionally substituted aryl group represented by $R^2$ in formula (3) are the same as those mentioned above as examples of the alkyl group of the optionally substituted aryl group represented by $R^1$ in formula (2).

Any known acrylic type monomers can be used as the acrylic type monomer represented by formula (3). Such acrylic type monomers may be used singly, or in a combination of two or more. Acrylamide, acrylic acid, methyl acrylate, and 2-hydroxyethyl methacrylate are preferred.

2. Production Method a. Dissolution

In the process of producing the present invention, the host group-containing monomer, guest group-containing monomer, and acrylic type monomer are mixed in an aqueous solvent and dissolved to produce an aqueous solvent solution. An inclusion complex of the host and guest groups is formed by dissolving the monomers in an aqueous solvent.

The aqueous solvent may be, for example, water, or a mixed solvent of water and an organic solvent compatible with water. Water is preferred.

Examples of the organic solvent compatible with water include N,N-dimethylformamide (DMF), tetrahydrofuran (THF), and dimethyl sulfoxide (DMSO). These organic solvents can be used singly, or in a combination of two or more. The mixing ratio (volume ratio) of water to the organic solvent in the mixed solvent is preferably in the range of 9:1 to 5:5, and particularly preferably 9:1 to 8:2.

The dissolution of the monomers in the aqueous solvent is performed by mixing the host group-containing monomer, guest group-containing monomer, and acrylic type monomer in the aqueous solvent, followed by stirring and heating.

Although the stirring means is not particularly limited, examples of usable methods include methods using magnetic stirrers and stirrer tips, methods using shakers, and methods using stirrers. The stirring temperature and time vary depending on the types and concentrations of the host group-containing monomer and guest group-containing monomer used. The stirring can be performed at room temperature (20 to 25° C.) for 8 hours to 3 days, and preferably performed at 25° C. for one day.

Although the heating method is also not particularly limited, examples include methods using a hot stirrer, and methods using a thermostat bath. The heating temperature and time vary depending on the types and concentrations of host group-containing monomer and guest group-containing monomer used. The heating can be performed at 40 to 80° C. for 1 hour to two days, and preferably at 50 to 80° C. for 2 to 6 hours, whereby the above monomers can be substantially evenly dissolved in an aqueous solvent.

The dissolution of the monomers in the aqueous solvent can be performed by heating after completion of the stirring, or by heating with continuous stirring after stirring for the aforementioned specific period of time.

The proportions of the monomers dissolved in the aqueous solvent (based on 100 wt. % of the total of the monomers) may be, for example, 30 to 0.5 mol % of a host group-containing monomer, 30 to 0.5 mol % of a guest group-containing monomer, and 40 to 99 mol % of an acrylic type monomer. The proportions are preferably 20 to 5 mol % of a host group-containing monomer, 20 to 5 mol % of a guest group-containing monomer, and 60 to 90 mol % of an acrylic type monomer.

The proportions (mol %) of the host group-containing monomer and guest group-containing monomer used may be, for example, such that the ratio of the host group-containing monomer to the guest group-containing monomer is in the range of 30:0.5 to 0.5:30. The proportions are preferably such that the ratio of the host group-containing monomer to the guest group-containing monomer is 1:1, such as 0.5:0.5 and 30:30.

b. Polymerization

In the production process of the present invention, the monomers are dissolved in an aqueous solvent, and these monomers are then copolymerized to produce a gel obtained from the monomers.

The copolymerization reaction is performed by adding a polymerization initiator and optionally a polymerization promoter to the aqueous solvent in which the monomers are dissolved.

Examples of the polymerization initiator include ammonium persulfate (hereinafter sometimes referred to as APS), azobisisobutyronitrile (hereinafter sometimes referred to as AIBN), 2,2'-azobis[2-(2-imidazolin-2-yl)propane]dihydrochloride (hereinafter sometimes referred to as VA-044), 1,1'-azobis(cyclohexanecarbonitrile), di-tert-butylperoxide, tert-butylhydroperoxide, benzoyl peroxide, photopolymerization initiators (Irgacure (registered trademark) series, etc.). APS, AIBN, and VA-044 are preferred.

The concentration of the polymerization initiator is preferably 0.5 to 5 mol %, based on the total amount of the monomers.

Examples of the polymerization promoter include [2-(dimethylamino)ethyl]dimethylamine (hereinafter sometimes referred to as TEMED). TEMED is preferred.

The copolymerization reaction can be performed at 0 to 100° C., and preferably 20 to 25° C.

The copolymerization time is 1 to 24 hours, and preferably 12 to 24 hours.

3. Gel

As described above, the gel of the present invention is obtained by dissolving a host group-containing monomer, a guest group-containing monomer, and an acrylic type monomer in an aqueous solvent, and then copolymerizing these monomers.

An inclusion complex of the host and guest groups is formed by dissolving monomers beforehand in an aqueous solvent. A gel is obtained by subsequently copolymerizing these monomers without adding a chemical crosslinking agent.

When a compound having two or more host groups is used in place of the host group-containing monomer, guest groups in the copolymer of the guest group-containing monomer and acrylic type monomer, and host groups in the compound containing two or more host groups are crosslinked to form a gel.

Similarly, when a compound containing two or more guest groups is used in place of the guest group-containing monomer, host groups in the copolymer of the host group-containing monomer and acrylic type monomer, and guest groups in the compound containing two or more guest groups are crosslinked to form a gel.

A preferable combination of the host and guest groups that form an inclusion complex is, for example, that when α-cyclodextrin (cavity size: 4.7 to 5.2 Å) is used as the host group, examples of the guest group include alkyl compounds of 4 to 18 carbon atoms, alcohol derivatives thereof, carboxylic acid derivatives, amino derivatives, azobenzene derivatives having a cyclic alkyl group or a phenyl group, and cinnamic acid derivatives. Examples of the alkyl compounds (groups) of 4 to 18 carbon atoms include n-butyl, pentyl, hexyl, heptyl, octyl, nonyl, decyl, undecyl, dodecyl, tridecyl, tetradecyl, pentadecyl, hexadecyl, heptadecyl, and octadecyl.

When β-cyclodextrin (cavity size: 6.0 to 6.5 Å) is used as the host group, examples of the guest group include t-butyl, adamantyl, aromatic compounds and alcohol derivatives thereof, carboxylic acid derivatives, amino derivatives, ferrocene derivatives, azobenzene, naphthalene derivatives, and dansyl.

When γ-cyclodextrin (cavity size: 7.5 to 8.5 Å) is used as the host group, examples of the guest group include alkyls of up to 18 carbon atoms, alcohol derivatives thereof, carboxylic acid derivatives, amino derivatives, adamantyl, clusters of carbon atoms such as fullerene, aromatic dansyl, ferrocene derivatives, and anthracene derivatives.

The gel of the present invention is formed via a non-covalent bond between a host group and a guest group. When the gel is ruptured (cut), the portion crosslinked by non-covalent host-guest interaction is mainly dissociated and cut off. Therefore, when the gel is merely allowed to stand with the rupture surfaces (cut surfaces) being in close contact with each other, the crosslinking is restored and the rupture surfaces are adhered. Thus, the gel of the present invention has self-healing properties.

Further, according to the gel of the present invention, when the rupture surface is brought into contact with a non-rupture surface (non-cut surface), no adhesion occurs. When competitor molecules are applied to a rupture surface, no adhesion occurs. Thus, the gel has healing surface selectivity in self-healing.

Further, because non-covalent host-guest interaction in the gel of the present invention allows for easy re-inclusion, the gel after re-adhesion tends to return to the original gel strength. The longer the adhesion time, the higher the strength recovery rate.

Additionally, because the gel of the present invention is formed through non-covalent bonding between a host group and a guest group, the gel is highly self-supporting and highly tensile. Further, the gel has shape-memory properties such that after stretching, the gel quickly returns to the original state.

The gel of the present invention preferably comprises 20 to 0.1 mol % of units derived from a host group-containing monomer, 20 to 0.1 mol % of units derived from a guest group-containing monomer, and 60 to 99.8 mol % of units derived from an acrylic type monomer. More preferably, the gel of the present invention comprises 13 to 0.3 mol % of units derived from a host group-containing monomer, 13 to 0.3 mol % of units derived from a guest group-containing monomer, and 74 to 99.4 mol % of units derived from an acrylic type monomer. The strength of the gel of the present invention increases as the content of the inclusion complex formed of the host and guest groups increases. The gel of the present invention is self-supporting, even when the inclusion complex content is 1 mol % or less.

EXAMPLES

The present invention is described below in more detail with reference to specific Examples. It should be noted, however, that the invention is not limited to the Examples, and various modifications can be made without departing from the substance of the invention.

Measurement Devices

In Examples and Comparative Examples, various physical properties were measured in the following manner.

Dynamic Viscoelasticity Measurement (Elastic Modulus Measurement)

Measuring instrument: MCR301, produced by Anton Paar GmbH

Measurement conditions: Strain 0.1%

Measurement range: 0.1 Hz to 1000 Hz

Rupture Stress Measurement (Quantitative Evaluation of Self-Healing)

Measuring instrument: RE-33005B, a creep meter, produced by Yamaden Co., Ltd.

Measurement conditions: Sample size 5×5×10 mm

Sweep rate: 0.05 mm/sec $^1$H NMR Measurement (Composition Ratio Calculation)

Measuring instrument: ECA-500, produced by JEOL

Measurement temperature: 30° C.

Solvent: DMSO-$d_6$

Example 1

In a sample bottle (3 mL), 92 mg (0.09 mmol) of 6-acrylamide-α-cyclodextrin obtained by the production method disclosed in WO2012/036069 and 12 mg (0.09 mmol) of n-butyl acrylate were placed, and acrylamide (produced by Wako Pure Chemical Industries, Ltd.) was added in an amount such that the total reagent amount of 6-acrylamide-α-cyclodextrin, n-butyl acrylate, and acrylamide became 0.5 mmol. Purified water (0.5 mL) was added to achieve a solution concentration of 1M. After this solution was stirred at 25° C. for 1 day, the mixture was heated to 80° C. and maintained at 80° C. for 1 hour, and the monomers were dissolved into water. After the monomer solution was allowed to cool to 25° C., 5.7 mg (0.025 mmol) of ammonium persulfate and 2.9 mg (0.025 mmol) of [2-(dimethylamino)ethyl]dimethylamine were added. Polymerization was allowed to proceed at 25° C. for 24 hours to obtain a gel comprising 6-acrylamide-α-cyclodextrin-derived units, n-butyl acrylate-derived units, and acrylamide-derived units at a 6-acrylamide-α-cyclodextrin-derived unit:n-butyl acrylate-derived unit:acrylamide-derived unit ratio of 12:11:77 (molar composition ratio).

Example 2

In a sample bottle (3 mL), 119 mg (0.1 mmol) of 6-acrylamide-β-cyclodextrin obtained by the production method disclosed in WO2012/036069 and 13 mg (0.1 mmol) of n-butyl acrylate (produced by Tokyo Kasei Kogyo Co., Ltd.) were placed, and acrylamide (produced by Wako Pure Chemical Industries, Ltd.) was added in an amount such that the total reagent amount of 6-acrylamide-β-cyclodextrin, n-butyl acrylate, and acrylamide became 0.5 mmol. Purified water (0.5 mL) was added to achieve a solution concentration of 1M. After this mixture was stirred at 25° C. for 1 day, the mixture was heated to 80° C. and maintained at 80° C. for 1 hour, and the monomers were dissolved into water. After the monomer solution was allowed to cool to 25° C., 5.7 mg (0.025 mmol) of ammonium persulfate and 2.9 mg (0.025 mmol) of [2-(dimethylamino)ethyl]dimethylamine were added. Polymerization was allowed to proceed at 25° C. for 24 hours to obtain a gel comprising 6-acrylamide-β-cyclodextrin-derived units, n-butyl acrylate-derived units, and acrylamide-derived units at a 6-acrylamide-β-cyclodextrin-derived unit:n-butyl acrylate-derived unit:acrylamide-derived unit ratio of 6:5:89 (molar composition ratio).

Example 3

In a sample bottle (3 mL), 104 mg (0.088 mmol) of 6-acrylamide-β-cyclodextrin obtained by the production method disclosed in WO2012/036069 and 11 mg (0.087 mmol) of t-butyl acrylate (produced by Tokyo Kasei Kogyo Co., Ltd.) were placed, and acrylamide (produced by Wako Pure Chemical Industries, Ltd.) was added in an amount such that the total reagent amount of 6-acrylamide-β-cyclodextrin, t-butyl acrylate, and acrylamide became 0.5 mmol. Purified water (0.5 mL) was added to achieve a solution concentration of 1M. After this mixture was stirred at 25° C. for 1 day, the mixture was heated to 80° C. and maintained at 80° C. for 1 hour, and the monomers were dissolved into water. After the monomer solution was allowed to cool to 25° C., 5.7 mg (0.025 mmol) of ammonium persulfate and 2.9 mg (0.025 mmol) of [2-(dimethylamino)ethyl]dimethylamine were added. Polymerization was allowed to proceed at 25° C. for 24 hours to obtain a gel comprising 6-acrylamide-β-cyclodextrin-derived units, t-butyl acrylate-derived units, and acrylamide-derived units at a 6-acrylamide-β-cyclodextrin-derived unit:t-butyl acrylate-derived unit:acrylamide-derived unit ratio of 8:3:89 (molar composition ratio).

Example 4

In a sample bottle (3 mL), 104 mg (0.088 mmol) of 6-acrylamide-β-cyclodextrin and 18 mg (0.087 mmol) of N-(1-adamanthyl)acrylamide obtained by the production method disclosed in WO2012/036069 were placed, and acrylamide (produced by Wako Pure Chemical Industries, Ltd.) was added in an amount to such that the total reagent amount of 6-acrylamide-β-cyclodextrin, N-(1-adamanthyl)acrylamide, and acrylamide became 0.5 mmol. Purified water (0.5 mL) was added to achieve a solution concentration of 1M. After this mixture was stirred at 25° C. for 1 day, the mixture was heated to 80° C. and maintained at 80° C. for 1 hour, and the monomers were dissolved into water. After the monomer solution was allowed to cool to 25° C., 5.7 mg (0.025 mmol) of ammonium persulfate and 2.9 mg (0.025 mmol) of [2-(dimethylamino)ethyl]dimethylamine were added. Polymerization was allowed to proceed at 25° C. for 24 hours to obtain a gel comprising 6-acrylamide-β-cyclodextrin-derived units, N-(1-adamanthyl)acrylamide-derived units, and acrylamide-derived units at a 6-acrylamide-β-cyclodextrin-derived unit:N-(1-adamanthyl)acrylamide-derived unit:acrylamide-derived unit ratio of 7:6:87 (molar composition ratio).

Example 5

(1) Synthesis of N-benzylacrylamide

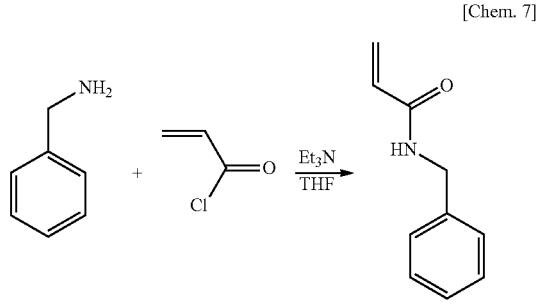

[Chem. 7]

2.5 mL (23 mmol) of benzylamine (produced by Tokyo Kasei Kogyo Co., Ltd.) was dissolved in 210 mL of tetrahydrofuran (produced by Nacalai Tesque, Inc.), and 4.0 mL (29 mL) of triethylamine (produced by Nacalai Tesque, Inc.) was added. The mixture was placed in an ice bath. After acryloyl chloride (produced by Tokyo Kasei Kogyo Co., Ltd.) was dissolved in 30 mL of THF, the solution was added dropwise to a tetrahydrofuran solution of benzylamine and triethylamine. The mixture was stirred at 25° C. After TLC showed the disappearance of starting material peaks, the generated precipitate was removed by filtration, and the solution was dried to dryness to obtain a crude purified product. This product was purified by column chromatography using silica gel (produced by Nacalai Tesque, Inc.), and using a mixed solvent of ethyl acetate/hexane (1/3, v/v). 3.9 g of the desired product was obtained with a yield of 97%. FIG. 9 shows $^1$H NMR (500 MHz, DMSO-$d_6$, 25° C.) of the obtained compound.

(2) Dissolving Method and Production of the Gel

In a sample bottle (3 mL), 29.7 mg (0.025 mmol) of 6-acrylamide-β-cyclodextrin and 4.0 mg (0.025 mmol) of N-benzylacrylamide obtained above in (1) were placed, and 31.9 mg (0.45 mmol) of acrylamide was added to make the total reagent amount 0.5 mmol. Purified water (0.5 mL) was added to achieve a solution concentration of 1M. After this mixture was stirred at 25° C. for 1 day, the mixture was heated to 70° C. and maintained at 70° C. for 5 hours, and the monomers were dissolved into water. After the monomer solution was allowed to cool to 25° C., 5.7 mg (0.025 mmol) of ammonium persulfate and 2.9 mg (0.025 mmol) of [2-(dimethylamino)ethyl]dimethylamine were added. Polymerization was allowed to proceed at 25° C. for 24 hours to obtain a gel.

Example 6

In a sample bottle (3 mL), 29.7 mg (0.025 mmol) of 6-acrylamide-β-cyclodextrin and 4.0 mg (0.025 mmol) of N-benzylacrylamide obtained in Example 5 (1) were placed and 31 μl (0.45 mmol) of acrylic acid (produced by Nacalai Tesque, Inc.) was added in an amount to make the total reagent amount 0.5 mmol. Purified water (0.5 mL) was added to achieve a solution concentration of 1M. After this mixture was stirred at 25° C. for 1 day, the mixture was heated to 70° C. and maintained at 70° C. for 5 hours, and the monomers were dissolved into water. After the monomer solution was allowed to cool to 25° C., 5.7 mg (0.025 mmol) of ammonium persulfate and 2.9 mg (0.025 mmol) of [2-(dimethylamino)ethyl]dimethylamine were added. Polymerization was allowed to proceed at 25° C. for 24 hours, and heated at 70° C. for 1 hour to obtain a gel.

Example 7

(1) Synthesis of N-1-naphthylmethylacrylamide

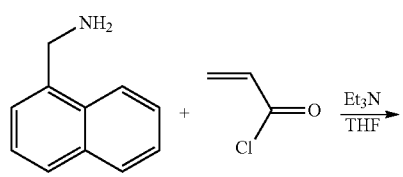

[Chem. 8]

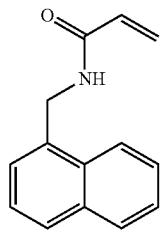

After 3.0 ml (18 mmol) of 1-naphthylmethylamine (produced by Sigma-Aldrich) was dissolved in 175 ml of tetrahydrofuran and 3.4 ml of triethylamine was added, the mixture was stirred in an ice bath. 1.9 ml of acryloyl chloride was dissolved in 25 ml of tetrahydrofuran, and the solution was added dropwise to a solution of 1-naphthylmethylamine and triethylamine in tetrahydrofuran. After the dropwise addition, the mixture was stirred at 25° C. After TLC confirmed complete consumption of the starting materials, the solids were filtrated, and the solution was dried to dryness to obtain a crude purified product. This crude purified product was purified using a mixed solvent of ethyl acetate/hexane (1/3, v/v) by silica gel column chromatography. 3.0 g of the desired product was obtained with a yield of 78%. FIG. 10 shows $^1$H NMR (500 MHz, DMSO-$d_6$, 25° C.) of the obtained compound.

(2) Dissolution Method and Production of the Gel

In a sample bottle (3 mL), 29.7 mg (0.025 mmol) of 6-acrylamide-β-cyclodextrin, 5.4 mg (0.026 mmol) of N-1-naphthylmethylacrylamide obtained in (1) above were placed, and 31.8 mg (0.45 mmol) of acrylamide was added to make the total reagent amount 0.5 mmol. 0.5 mL of a mixed solvent of DMSO/$H_2O$=1/2 was added to achieve a solution concentration of 1M. After this solution was stirred at 25° C. for 1 day, the solution was heated to 70° C. and maintained at 70° C. for 2 hours, and the monomers were dissolved into water. After the monomer solution was allowed to cool to 25° C., 5.7 mg (0.025 mmol) of ammonium persulfate and 2.9 mg (0.025 mmol) of [2-(dimethylamino)ethyl]dimethylamine were added. Polymerization was allowed to proceed at 25° C. for 24 hours to obtain a gel comprising 6-acrylamide-β-cyclodextrin-derived units, N-1-naphthylmethylacrylamide-derived units, and alkylamide-derived units at a 6-acrylamide-β-cyclodextrin-derived unit: N-1-naphthylmethylacrylamide-derived unit:alkylamide-derived unit ratio of 4:2:94 (molar composition ratio).

Example 8

In a sample bottle (3 mL), 29.7 mg (0.025 mmol) of 6-acrylamide-β-cyclodextrin and 3 μl (0.026 mmol) of styrene were placed, and 32.5 mg (0.46 mmol) of acrylamide was added to make the total reagent amount 0.5 mmol. Purified water (0.5 mL) was added to achieve a solution concentration of 1M. After this mixture was stirred at 25° C. for 1 day, the mixture was heated to 50° C. and maintained at 50° C. for 24 hours, and the monomers were dissolved into water. 5.7 mg (0.025 mmol) of ammonium persulfate and 2.9 mg (0.025 mmol) of [2-(dimethylamino)ethyl]dimethylamine were added. Polymerization was allowed to proceed at 25° C. for 24 hours to obtain a gel.

Example 9

In a sample bottle (3 mL), 29.7 mg (0.025 mmol) of 6-acrylamide-β-cyclodextrin and 3 µl (0.026 mmol) of styrene were placed, and 41 µl (0.46 mmol) of methyl acrylate was added to make the total reagent amount 0.5 mmol. Purified water (0.5 mL) was added to achieve a solution concentration of 1M. After this solution was stirred at 25° C. for 1 day, the solution was heated to 50° C. and maintained at 50° C. for 24 hours, and the monomers were dissolved into water. 5.7 mg (0.025 mmol) of ammonium persulfate and 2.9 mg (0.025 mmol) of [2-(dimethylamino)ethyl]dimethylamine were added, and polymerization was allowed to proceed at 25° C. for 24 hours to obtain a gel.

Example 10

In a sample bottle (3 mL), 29.7 mg (0.025 mmol) of 6-acrylamide-β-cyclodextrin and 3 µl (0.026 mmol) of styrene were placed, and 30 µl (0.45 mmol) of acrylic acid was added to make the total reagent amount 0.5 mmol. Pure water (0.5 mL) was added to achieve a solution concentration of 1M. After this solution was stirred at 25° C. for one day, the solution was heated to 50° C. and maintained at 50° C. for 24 hours, and the monomers were dissolved into water. 5.7 mg (0.025 mmol) of ammonium persulfate and 2.9 mg (0.025 mmol) of [2-(dimethylamino)ethyl]dimethylamine were added. Polymerization was allowed to proceed at 25° C. for 24 hours and at 70° C. for 2 hours to obtain a gel.

Example 11

In a sample bottle (3 mL), 25.6 mg (0.025 mmol) of 6-acrylamide-α-cyclodextrin and 3 µl (0.026 mmol) of styrene were placed, and 54 µl (0.45 mmol) of 2-hydroxyethyl methacrylate was added to make the total reagent amount 0.5 mmol. Pure water (0.5 mL) was added to achieve a solution concentration of 1M. After this solution was stirred at 25° C. for one day, the solution was stirred at 50° C. for one day to dissolve the monomers into water. 5.7 mg (0.025 mmol) of ammonium persulfate and 2.9 mg (0.025 mmol) of [2-(dimethylamino)ethyl]dimethylamine were added. Polymerization was allowed to proceed at 50° C. for 24 hours and at 70° C. for 2 hours to obtain a gel.

Example 12

In a sample bottle (3 mL), 29.7 mg (0.025 mmol) of 6-acrylamide-β-cyclodextrin and 3 µl (0.026 mmol) of styrene were placed, and 54 µl (0.45 mmol) of 2-hydroxyethyl methacrylate was added to make the total reagent amount 0.5 mmol. Pure water (0.5 mL) was added to achieve a solution concentration of 1M. After this solution was stirred at 25° C. for one day, the solution was stirred at 50° C. for one day to dissolve the monomers into water. 5.7 mg (0.025 mmol) of ammonium persulfate and 2.9 mg (0.025 mmol) of [2-(dimethylamino)ethyl]dimethylamine were added. Polymerization was allowed to proceed at 50° C. for 24 hours and at 70° C. for 2 hours to obtain a gel.

Example 13

(1) Preparation of a Compound Containing Two Guest Groups (Adamantyl Groups)

[Chem. 9]

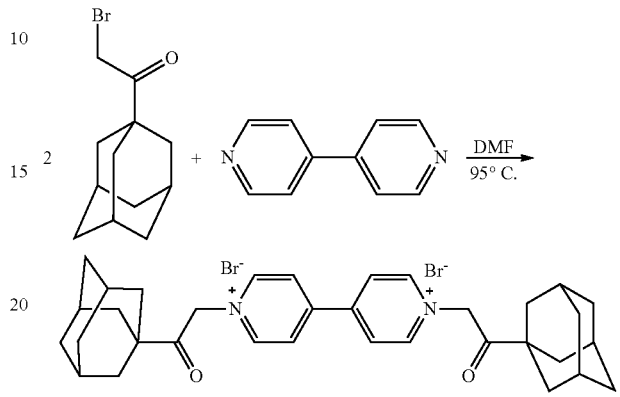

200 mg (0.78 mmol) of 1-adamantyl bromomethyl ketone (produced by Sigma-Aldrich Corp.) and 61 mg (0.39 mmol) of 4,4-dipyridyl (produced by Nacalai Tesque, Inc.) were dissolved in DMF (5 mL) and stirred in an oil bath (95° C.) for 24 hours. After TLC confirmed the disappearance of starting material spots, the temperature was returned to room temperature, and the precipitate was filtered and washed with ether (crude product 123 mg). This crude product was dissolved in methanol (30 mL), and allowed to stand in a freezer. After the precipitate of the desired product was filtered, the precipitate was dried in a vacuum oven for 14 hours to obtain 87.3 mg of the desired product (yield 44.2%).

MALDI TOF MS: m/z=510.10 ([$C_{36}H_{44}O_2N_2Br_2$+H]$^+$=510.71, 0.23% error)

melting point: over 300° C.

Elemental Anal. Calced for $C_{34}H_{42}O_2N_2Br_2(H_2O)_1$: C, 59.31; H, 6.44; N, 4.07.

Found: C, 59.31; H, 6.27; N, 4.05. (0.17% error).

FIG. 11 shows $^1$HNMR (500 MHz, DMSO-d$_6$, 30° C.) of the obtained compound.

(2) Dissolving Method and Gel Production

In a sample bottle (3 mL), 59 mg (0.05 mmol) of 6-acrylamide-β-cyclodextrin and 13 mg (0.025 mmol) of the compound containing two adamantyl groups obtained in (1) above were placed, and 34 mg (0.48 mmol) of acrylamide was added to make the total reagent amount of 6-acrylamide-β-cyclodextrin and acrylamide 0.5 mmol. Pure water (500 µL) was added to achieve a solution concentration of 1M. After this solution was stirred at 25° C. for 1 day, the solution was heated in an oil bath at 45° C. for 24 hours to dissolve the monomers into water. After 8.1 mg (0.025 mmol) of 2,2'-azobis[2-(2-imidazoline-2-yl)propane]dihydrochloride was added to the monomer solution and the mixture was subjected to argon bubbling for 30 minutes, the mixture was left in an oil bath at 42° C. to allow polymerization to proceed for 24 hours, thus obtaining a gel.

Example 14

(1) Production of a Compound Containing Two Guest Groups (Adamantyl Groups)

[Chem. 10]

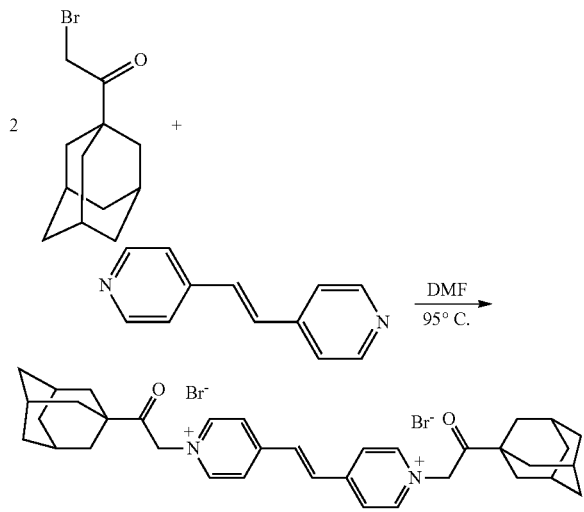

500 mg (1.94 mmol) of 1-adamantyl bromomethyl ketone and 177 mg (0.972 mmol) of 1,2-bis(4-pyridyl)ethylene (produced by Sigma-Aldrich Corporation) were dissolved in DMF (5 mL) and stirred in an oil bath (95° C.) for 24 hours. After TLC confirmed the disappearance of starting material spots, the temperature was returned to room temperature, and the precipitate was filtered and washed with ether (crude product 207.7 mg). This crude product was dissolved in methanol (40 mL), and allowed to stand in a freezer. After the precipitate of the desired product was filtered, the precipitate was dried in a vacuum oven for 14 hours to obtain 87.3 mg of the desired product (yield: 42.3%).

MALDI TOF MS: m/z=536.10 ([$C_{36}H_{44}O_2N_2Br_2$+H]$^+$=537.35, 0.23% error)

melting point: over 300° C.

Elemental Anal. Calcd for $C_{36}H_{44}O_2N_2Br_2(H_2O)_{0.5}$: C, 61.28; H, 6.43; N, 3.97.

Found: C, 61.33; H, 6.22; N, 4.05. (0.2% error).

FIG. 12 shows $^1$H NMR (500 MHz, DMSO-$d_6$, 30° C.) of the obtained compound.

(2) Dissolution Method and Gel Production

In a sample bottle (3 mL), 59 mg (0.05 mmol) of 6-acrylamide-β-cyclodextrin and 13 mg (0.025 mmol) of the compound containing two adamantyl groups obtained in (1) above were placed, and 34 mg (0.48 mmol) of acrylamide was added to make the total reagent amount of 6-acrylamide-β-cyclodextrin and acrylamide 0.5 mmol. Pure water (500 μL) was added to achieve a solution concentration of 1M. After this solution was stirred at 25° C. for one day, the solution was heated in an oil bath at 45° C. for 24 hours to dissolve the monomers into water. After 8.0 mg (0.025 mmol) of 2,2'-azobis[2-(2-imidazoline-2-yl)propane]dihydrochloride was added to the monomer solution and the mixture was subjected to argon bubbling for 30 minutes, the mixture was left in an oil bath at 42° C. to allow polymerization to proceed for 24 hours, thus obtaining a gel.

Comparative Example 1

In a sample bottle (10 mL), 92 mg (0.09 mmol) of 6-acrylamide-α-cyclodextrin and 12 mg (0.09 mmol) of n-butyl acrylate (produced by Tokyo Chemical Industry, Co., Ltd.) were placed, and acrylamide (produced by Wako Pure Chemical Industries, Ltd.) was added in an amount such that the total reagent amount of 6-acrylamide-α-cyclodextrin, n-butyl acrylate, and acrylamide became 1 mmol. Pure water (1 mL) was added to achieve a solution concentration of 1M, and the solution was stirred at 25° C. for one day. The monomers were suspended, rather than dissolved. 11.4 mg (0.05 mmol) of ammonium persulfate and 5.8 mg (0.05 mmol) of [2-(dimethylamino)ethyl]dimethylamine were added to the suspension to allow polymerization to proceed at 25° C. for 24 hours. No gel was obtained.

Test Example 1 (Change In Viscoelasticity Depending On The Composition Ratio Of The Host And Guest Groups)

(1) In Example 1, 6-acrylamide-α-cyclodextrin and n-butyl acrylate were used at 6-acrylamide-α-cyclodextrin:n-butyl acrylate ratios of 51 mg (0.050 mmol):6.3 mg (0.050 mmol), 77 mg (0.075 mmol):9.4 mg (0.075 mmol), 92 mg (0.090 mmol):12 mg (0.091 mmol), and 103 mg (0.1 mmol):13 mg (0.1 mmol) to obtain gels comprising 6-acrylamide-α-cyclodextrin-derived units and n-butyl acrylate-derived units at 6-acrylamide-α-cyclodextrin-derived unit:n-butyl acrylate-derived unit ratios of 0.7:0.3, 4:5, 9:9, and 12:11 (molar composition ratios).

Figure 1:
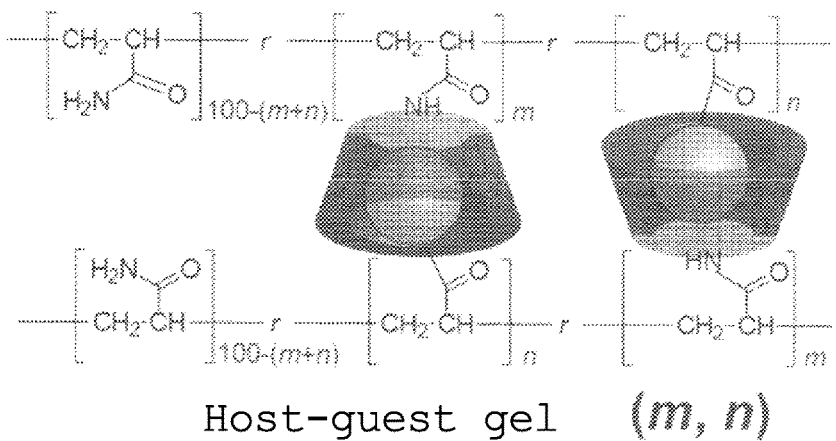
FIG. 1 illustrates a gel according to the present invention.
Figure 2:
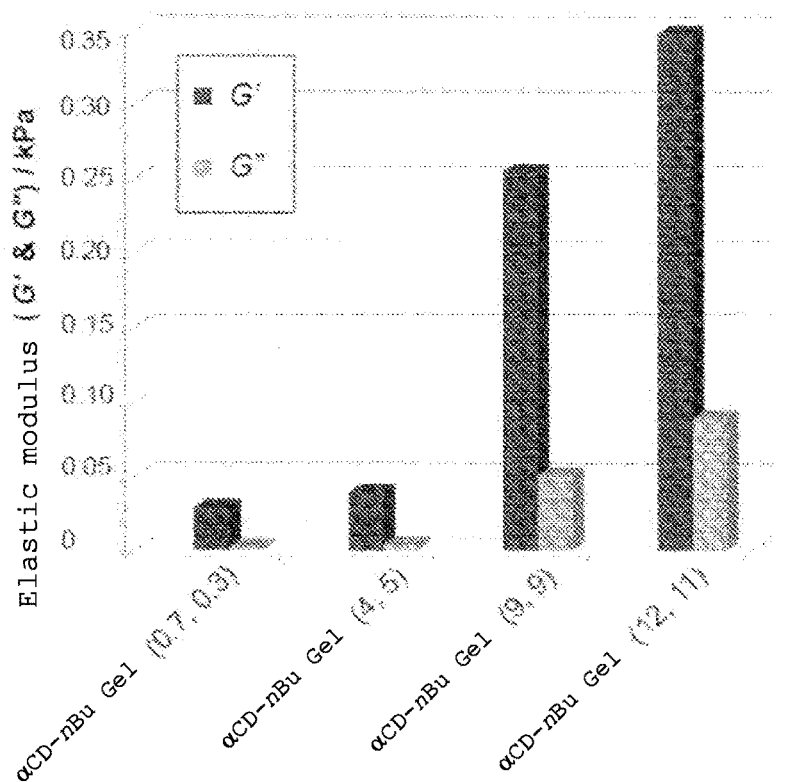
FIG. 2 is a diagram showing changes in viscoelasticity versus the composition ratio of the host and guest groups in a gel according to the present invention (host group: α-cyclodextrin, guest group: n-butyl).

The dynamic viscoelasticity of the above three types of gels and the gel obtained in Example 1 was measured with MCR301 produced by Anton Paar. FIG. 2 shows the results.

(2) Similarly in Example 4, 6-acrylamide-β-cyclodextrin and N-(1-adamantyl)acrylamide were used at 6-acrylamide-β-cyclodextrin:N-(1-adamantyl)acrylamide ratios of 29 mg (0.026 mmol):5.5 mg (0.026 mmol), 59 mg (0.05 mmol):10 mg (0.05 mmol), 104 mg (0.088 mmol):18 mg (0.087 mmol), and 119 mg (0.1 mmol):21 mg (0.1 mmol) to obtain gels comprising 6-acrylamide-β-cyclodextrin-derived units and N-(1-adamantyl)acrylamide-derived units at 6-acrylamide β-cyclodextrin-derived unit:N-(1-adamantyl)acrylamide-derived unit ratios of 0.3:0.4, 1.6:1.9, 3.5:4.0, and 7:6 (molar composition ratios).

Figure 3:
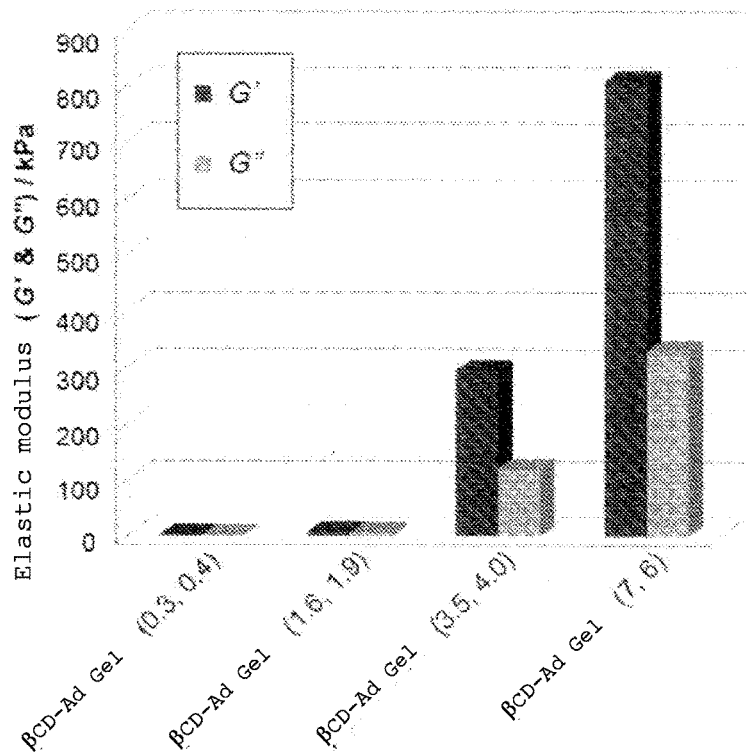
FIG. 3 is a diagram showing changes in viscoelasticity depending on the composition ratio of the host and guest groups in a gel according to the present invention (host group: β-cyclodextrin, guest group: adamantane).

The dynamic viscoelasticity of the above three types of gels and the gel obtained in Example 4 was measured with MCR301 produced by Anton Paar. FIG. 3 shows the results.

Test Example 2 (Re-adhesion Of The Gel)

Figure 4:
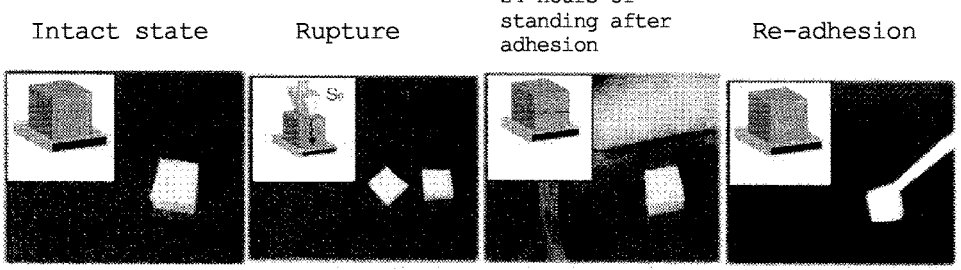
FIG. 4 is a diagram showing the states of rupture and re-adhesion of a gel of the present invention (host group: α-cyclodextrin, guest group: n-butyl).

(1) The gel obtained in Example 1 was cut into a 5 mm×5 mm×10 mm cuboid, and ruptured into two pieces at the center using a wedge-type jig (P-28, produced by Yamaden Co., Ltd.). The rupture surfaces were brought into face-to-face contact, and the gel was allowed to stand in water at 25° C. for 24 hours. As a result, the gel re-adhered. FIG. 4 shows the states of rupture and re-adhesion of the gel.

Figure 5:
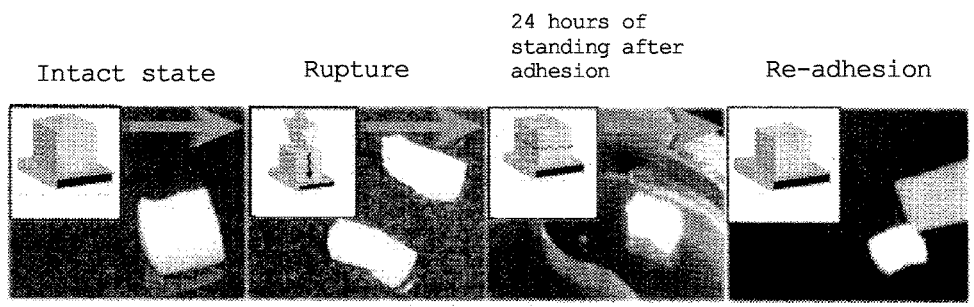
FIG. 5 is a diagram showing the states of rupture and re-adhesion of a gel of the present invention (host group: β-cyclodextrin, guest group: adamantane).

(2) The gel obtained in Example 4 was cut into a 5 mm×5 mm×10 mm cuboid, and ruptured into two pieces at the center using a wedge-type jig (P-28, produced by Yamaden Co., Ltd.). The rupture surfaces were brought into face-to-face contact, and the gel was allowed to stand in water at 25° C. for 24 hours. As a result, the gel re-adhered. FIG. 5 shows the states of rupture and re-adhesion of the gel.

Test Example 3 (Host-guest Competition Test 1)

(1) The gel obtained in Example 1 was cut into a 5 mm×5 mm×5 mm cube, and ruptured into two pieces at the center using a razor. After 1-hexanol was applied to one of the rupture surfaces, the gel was allowed to stand in water at 25° C. for 24 hours with the rupture surfaces being in face-to-face contact. The gel did not re-adhere.

(2) The gel obtained in Example 4 was cut into a 5 mm×5 mm×5 mm cube, and ruptured into two pieces at the center using a razor. After an aqueous adamantanecarboxylic acid sodium solution was applied to one of the rupture surfaces, the gel was allowed to stand in water at 25° C. for 24 hours with the rapture surfaces being in face-to-face contact. The gel did not re-adhere.

Test Example 4 (Evaluation Of Adhesive Bonding Strength Of The Gel)

Figure 6:
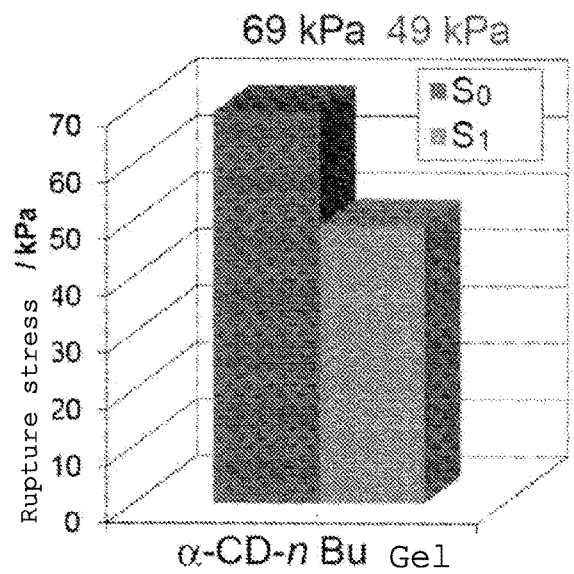
FIG. 6 is a diagram showing adhesion strength of the gel of the present invention (host group: α-cyclodextrin, guest group: n-butyl) before rupture and after (24 hours of) re-adhesion.

(1) The stress at rupture (hereinafter sometimes referred to as "rupture stress") of the gel before rupturing and that of the gel after re-adhesion in Test Example 2 (1) were measured using a creep meter (RE2-33005B; produced by Yamaden Co., Ltd.). Calculation was made to determine to what extent rupture stress was recovered relative to the rupture stress of the gel before rupturing. The stress recovery rate was 72%. FIG. 6 shows the results.

Figure 7:
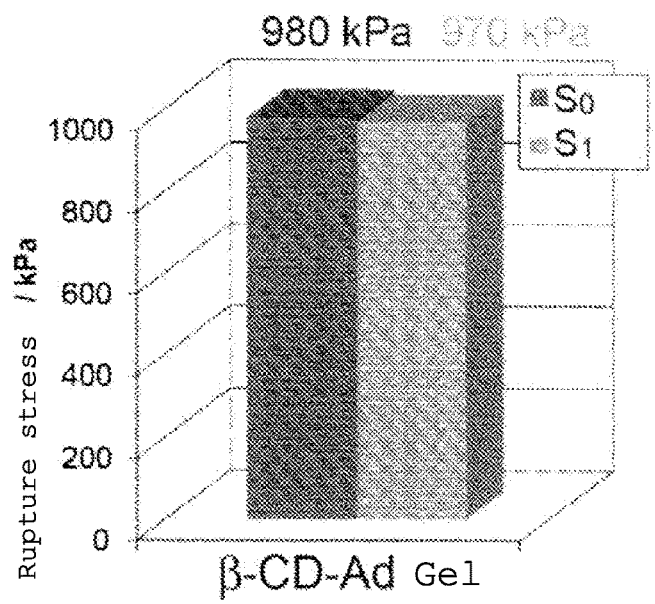
FIG. 7 is a diagram showing adhesion strength of the gel of the present invention (host group: β-cyclodextrin, guest group: adamantane) before rupture and after (24 hours of) re-adhesion.

(2) The rupture stress of the gel before rupturing and that of the gel after re-adhesion in Test Example 2 (2) were measured using a creep meter (RE2-33005B; produced by Yamaden Co., Ltd.). Calculation was made to determine to what extent rupture stress was recovered relative to the rupture stress of the gel before rupturing. The stress recovery rate was 99%. FIG. 7 shows the results.

Figure 8:
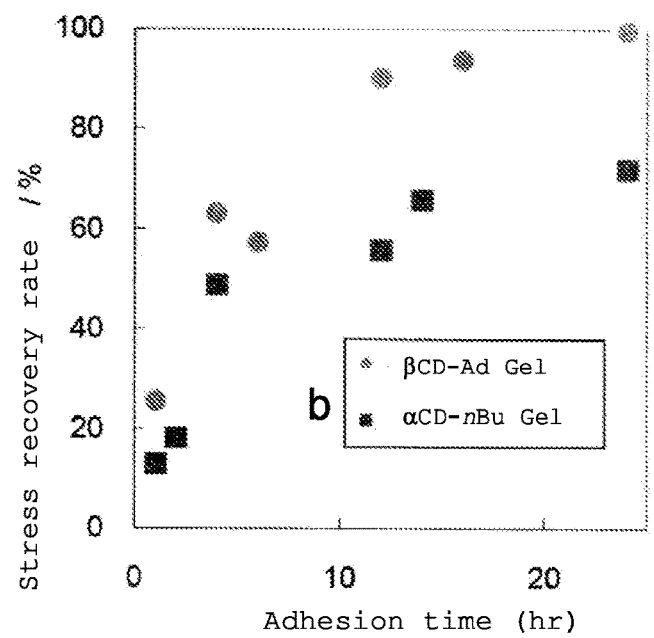
FIG. 8 is a diagram showing the recovery rate of adhesion strength of the gels of the present invention (host group.

(3) The gels obtained in Examples 1 and 4 were cut into 5 mm×5 mm×10 mm cuboids. Each gel cuboid was ruptured into two pieces at the center using a wedge-type jig (P-28; produced by Yamaden). With the rupture surfaces being in face-to-face contact, the gels were allowed to stand in water at 25° C. for 1 hour, 2 hours, 4 hours, 6 hours, 12 hours, 14 hours, 16 hours, and 24 hours. The stress at rupture of each re-adhered gel was measured using a creep meter (RE2-33005B, produced by Yamaden Co., Ltd.). Calculation was made to determine to what extent rupture stress was recovered relative to the rupture stress of the gel before rupturing. The stress recovery rate of the gel increases as the re-adhesion time increases. FIG. 8 shows the results.

Test Example 5 (Changes In Gel Strength Depending On The Composition Ratio Of The Host And Guest Groups)

In Example 4, 6-acrylamide-β-cyclodextrin and N-(1-adamantyl)acrylamide were used at ratios of 6-acrylamide-β-cyclodextrin to N-(1-adamantyl)acrylamide of 6 mg (0.005 mmol):1 mg (0.005 mmol), 29 mg (0.026 mmol):6 mg (0.026 mmol), 45 mg (0.038 mmol):8 mg (0.038 mmol), and 59 mg (0.050 mmol):10 mg (0.050 mmol) to obtain gels comprising 6-acrylamide-β-cyclodextrin-derived units and N-(1-adamantyl)acrylamide-derived units at 6-acrylamide-β-cyclodextrin-derived unit:N-(1-adamantyl)acrylamide-derived unit ratios of 0.1:0.1, 0.3:0.4, 1.0:1.4, and 1.6:1.9 (molar composition ratios).

The obtained gels were cut into 5 mm×5 mm×10 mm cuboids. The rupture strength of the gel cuboids was measured at a pulling rate of 5 mm/sec using a creep meter (RE2-33005B, produced by Yamaden, Co., Ltd.). As the composition ratio of the host and guest groups increases, the rupture strength (break strength) increases.

Test Example 6 (Host And Guest Competition Test 2)

The gels having four types of compositions prepared in Test Example 5 were immersed in 10 mM aqueous solutions of competitor molecules (α-cyclodextrin, β-cyclodextrin, γ-cyclodextrin, and 1-adamantanecarboxylic acid sodium salt) for 1 hour. Subsequently, the rupture strength of each gel was measured in the same manner as in Test Example 6. Immersion of the gels in the solutions of β-cyclodextrin and 1-adamantanecarboxylic acid sodium salt resulted in a lower rupture strength.

Test Example 7 (Evaluation Of Shape Recovery Of The Gel)

The gel comprising 6-acrylamide-β-cyclodextrin-derived units and N-(1-adamantyl)acrylamide-derived units at a ratio of the 6-acrylamide-β-cyclodextrin-derived units to the N-(1-adamantyl)acrylamide-derived units of 0.3:0.4 (10 mm×10 mm×5 mm) was pulled with a tensile stress of 0.1N to 1N, and then retained at no stress. The strain at no stress after pulling was measured to evaluate the shape recovery of the gel. When the gel was stretched to 180% at 0.1N and then retained at no stress, a strain of 0% was observed after 200 seconds.

Test Example 8 (Evaluation Of Maintenance Of Self-Healing Ability Of The Gel)

The gel obtained in Example 4 was cut into 5 mm×5 mm×10 mm cuboids. Each gel cuboid was ruptured into two pieces at the center using a wedge-type jig (P-28; produced by Yamaden), and allowed to stand in water at 25° C. for 1 hour, 3 hours, 6 hours, 12 hours, 15 hours, 18 hours, and 24 hours. After lapse of each time, the rupture surfaces were brought into face-to-face contact, and the gel was allowed to stand in water for 24 hours. The stress at rupture of the re-adhered gel was measured with a creep meter (RE2-33005B, produced by Yamaden, Co., Ltd.) Calculation was made to determine to what extent the rupture stress was recovered relative to the rupture stress of the gel before rupturing. The stress of the gel was recovered regardless of the lapse of time after rupture. FIG. 13 shows the results.

Experimental Example 1

The gel comprising 6-acrylamide-β-cyclodextrin-derived units and N-(1-adamantyl)acrylamide-derived units at a ratio of the 6-acrylamide-β-cyclodextrin-derived units to the N-(1-adamantyl)acrylamide-derived units of 0.3:0.4 (10 mm×10 mm×3 mm), which was prepared in Test Example 5, was sandwiched between two sheets of slide glass, and a pressure of 150 g was applied in water for one day, followed by drying at 25° C. at a humidity of 42% for one day. FIG. 14 shows a photograph after the compression in water and a photograph after the drying.

INDUSTRIAL APPLICABILITY

Making use of its excellent self-healing and shape memory properties, the gel of the present invention can be used, for example, for paint resins, coating films, shock absorbers, plastic containers, vascular embolization materials for medical use (e.g., hydrogel beads), and detachable adhesives.

The invention claimed is:
1. A process for producing an aqueous solvent solution containing a host group-containing monomer, a guest group-containing monomer, and an acrylic monomer, the process comprising the steps of mixing the host group-containing monomer, the guest group-containing monomer, and the acrylic monomer in an aqueous solvent, and heating the mixture obtained in the above step at 40 to 80° C. in the absence of a polymerization initiator to obtain an aqueous solvent solution of the monomers, wherein the host group is at least one member selected from the group consisting of α-cyclodextrin, β-cyclodextrin, and γ-cyclodextrin, and the host group of the host group-containing monomer and the guest group of the guest group-containing monomer form an inclusion complex.

2. The process according to claim 1, wherein the host group-containing monomer is a monomer represented by formula (1)

[Chem. 1]

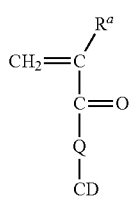

(1)

wherein Q is O or NH, CD is α-cyclodextrin, β-cyclodextrin, or γ-cyclodextrin, and $R^a$ is a hydrogen atom or a methyl group.

3. The process according to claim 1, wherein the guest group-containing monomer is a monomer represented by formula (2)

[Chem. 2]

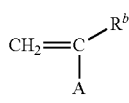

(2)

wherein A is an optionally substituted aryl group, C(O)OR1, or C(O)NHR1, R1 is an optionally substituted alkyl group, an optionally substituted aryl group, or an optionally substituted arylalkyl group, and $R^b$ is a hydrogen atom or a methyl group.

4. The process according to claim 1, wherein the acrylic monomer is a monomer represented by formula (3)

[Chem. 3]

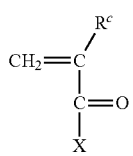

(3)

wherein X is OR2 or NH2, R2 is a hydrogen atom, an optionally substituted alkyl group, or an optionally substituted aryl group, and $R^c$ is a hydrogen atom or a methyl group.

5. The process according to claim 1, wherein the host group-containing monomer is used in an amount of 30 to 0.5 mol %, the guest group-containing monomer is used in an amount of 30 to 0.5 mol %, and the acrylic monomer is used in an amount of 40 to 99mol %.

6. The process according to claim 1, wherein the aqueous solvent is water or a mixed solvent of water and an organic solvent compatible with water.

7. A process for producing a gel, comprising the process for producing an aqueous solvent solution containing a host group-containing monomer, a guest group-containing monomer, and an acrylic monomer according to claim 1 and copolymerizing the host group-containing monomer, the guest group-containing monomer, and the acrylic monomer to produce a gel.

8. The process according to claim 2, wherein the guest group-containing monomer is a monomer represented by formula (2)

[Chem. 2]

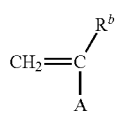

(2)

wherein A is an optionally substituted aryl group, C(O)OR1, or C(O)NHR1, R1 is an optionally substituted alkyl group, an optionally substituted aryl group, or an optionally substituted arylalkyl group, and $R^b$ is a hydrogen atom or a methyl group.

9. The process according to claim 2, wherein the acrylic monomer is a monomer represented by formula (3)

[Chem. 3]

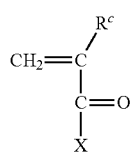

(3)

wherein X is OR2 or NH2, R2 is a hydrogen atom, an optionally substituted alkyl group, or an optionally substituted aryl group, and $R^c$ is a hydrogen atom or a methyl group.

10. The process according to claim 3, wherein the acrylic monomer is a monomer represented by formula (3)

[Chem. 3]

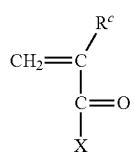

(3)

wherein X is OR2 or NH2, R2 is a hydrogen atom, an optionally substituted alkyl group, or an optionally substituted aryl group, and $R^c$ is a hydrogen atom or a methyl group.

11. The process according to claim 2, wherein the host group containing monomer is used in an amount of 30 to 0.5 mol %, the guest group-containing monomer is used in an amount of 30 to 0.5 mol %, and the acrylic monomer is used in an amount of 40 to 99mol %.

12. The process according to claim 3, wherein the host group-containing monomer is used in an amount of 30 to 0.5 mol %, the guest group-containing monomer is used in an amount of 30 to 0.5 mol %, and the acrylic monomer is used in an amount of 40 to 99mol %.

13. The process according to claim 4, wherein the host group-containing monomer is used in an amount of 30 to 0.5 mol %, the guest group-containing monomer is used in an amount of 30 to 0.5 mol %, and the acrylic monomer is used in an amount of 40 to 99 mol %.

14. The process according to claim 2, wherein the aqueous solvent is water or a mixed solvent of water and an organic solvent compatible with water.

15. The process according to claim 3, wherein the aqueous solvent is water or a mixed solvent of water and an organic solvent compatible with water.

16. The process according to claim 4, wherein the aqueous solvent is water or a mixed solvent of water and an organic solvent compatible with water.

17. The process according to claim 1, wherein the guest group-containing monomer is a monomer represented by formula (2)

[Chem. 2]

(2)

wherein A is an optionally substituted aryl group, C(O)OR1, or C(O)NHR1, R1 is an optionally substituted alkyl group, an optionally substituted aryl group, and the alkyl group is selected from a group consisting of n-butyl, isobutyl, sec-butyl, tert-butyl, pentyl, cyclopentyl, hexyl, cyclohexyl, isohexyl, dodecyl, octadecyl, and adamantly, and the aryl group is selected from a group consisting of phenyl, toluoyl, xylyl, naphthyl, anthryl, and phenanthryl; the acrylic monomer is different from the host group-containing monomer and the guest group-containing monomer; and $R^b$ is a hydrogen atom or a methyl group.

* * * * *